R. B. GOODYEAR.
Improvement in Heddle-Actuating Mechanisms.

No. 129,126. Patented July 16, 1872.

WITNESSES: Harry Smith, John Parker

Robert B. Goodyear
by his Atty,

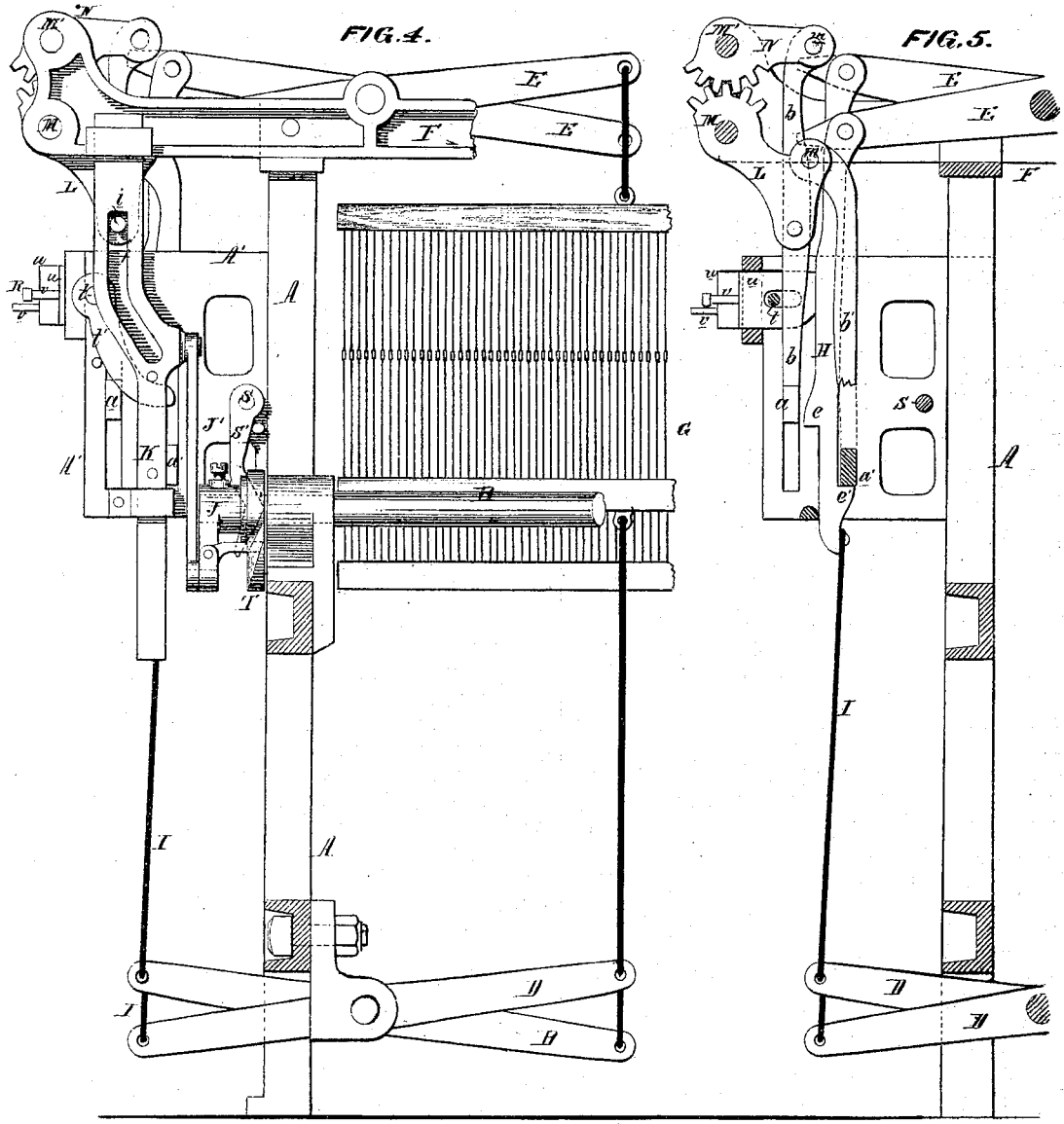

129,126

UNITED STATES PATENT OFFICE.

ROBERT B. GOODYEAR, OF WILMINGTON, DELAWARE.

IMPROVEMENT IN HEDDLE-ACTUATING MECHANISMS.

Specification forming part of Letters Patent No. 129,126, dated July 16, 1872.

Specification describing Improvements in Looms, invented by ROBERT B. GOODYEAR, of the city of Wilmington, county of New Castle, State of Delaware.

*Improvement in Looms.*

My invention consists of mechanism, too fully explained hereafter to need preliminary description, for operating in connection with the harness motion of looms, the said mechanism being a light and simple substitute for the more complex and expensive chain heretofore used for controlling the jacks of the heddles.

Figure 1:
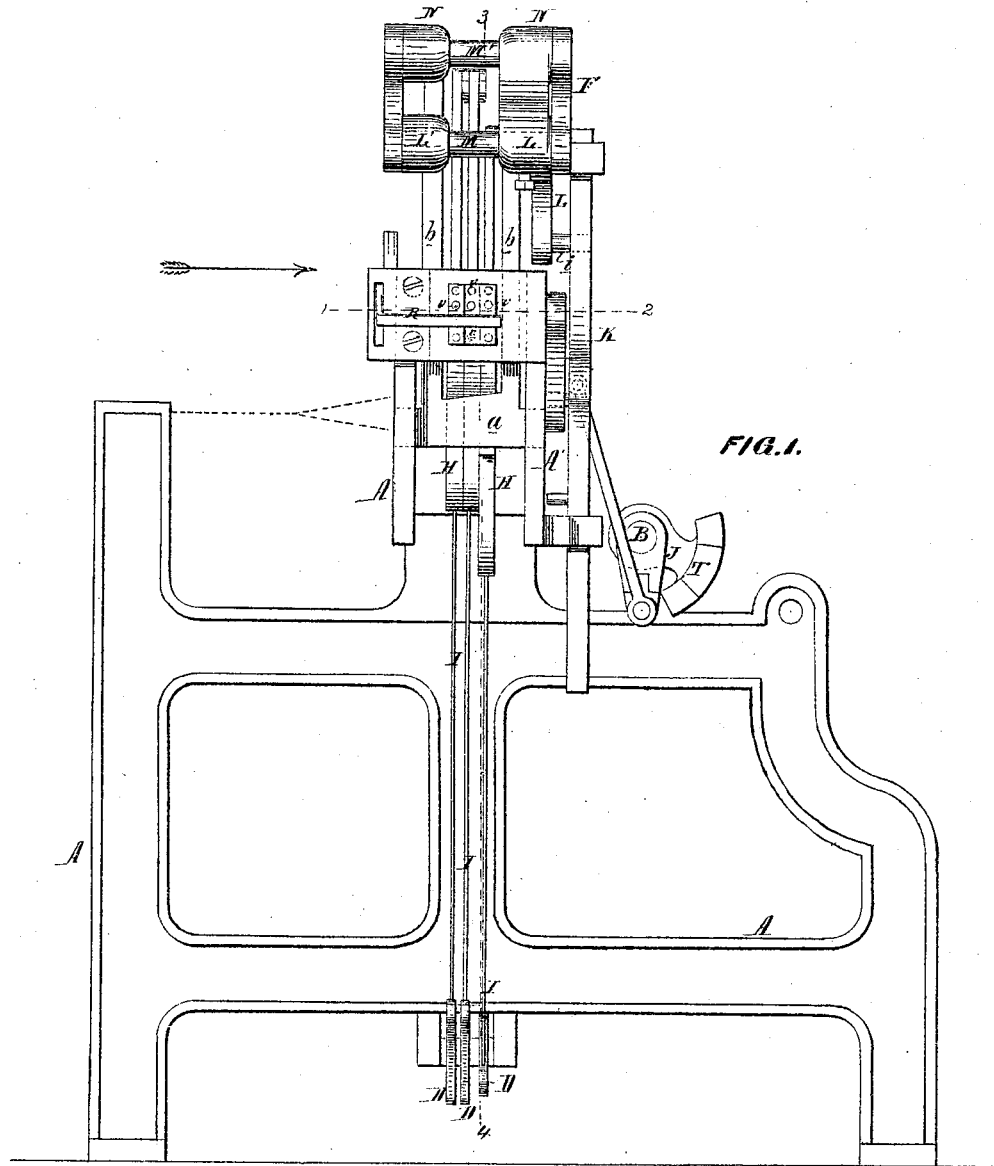
Figure 2:
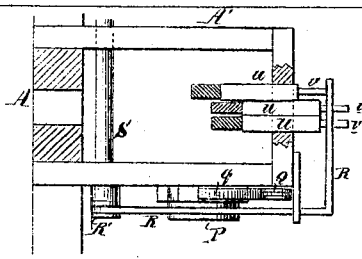
Figure 3:
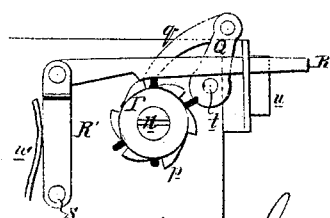

Figure 1, Sheet 1, is a side view of a loom with my improvements; Fig. 2, a sectional plan on the line 1 2; Fig. 3, a part of the operating mechanism as seen when looking in the direction of the arrow, Fig. 1; Fig. 4, Sheet 2, a front view of the harness; and Fig. 5, a vertical section on the line 3 4, Fig. 1.

A is one of the end frames of the loom, and B is the usual cranked shaft; D D, one of the lower heddle-levers hung to a bracket on the frame, and E E are the upper heddle-levers hung to a cross-bar, F, which connects together the opposite end frames of the loom. The inner arms of the lower levers are connected by the usual heddles, G to the corresponding arms of the upper levers, and the outer arm of each lower lever is connected to the outer arm of one of the upper levers by a cord, I, and hooked jack H, as shown in Fig. 5, each hooked jack being provided with an upper projection, $e$, to be struck by a reciprocating bar or lifter, $a$, and a lower projection, $e'$, to be struck by a reciprocating bar or depresser, $a'$, under the circumstances rendered apparent hereafter.

The required reciprocating motion in contrary directions is imparted to these bars by the mechanism which I will now proceed to describe: The pin of a crank, J, on the driving-shaft B, is connected to a bar, K, which is arranged to slide in guides on a frame, A', secured to the frame A, and in this sliding bar is a slot, $f$, for receiving a pin, $i$, on a lever, L, secured to a rocking shaft, M, adapted to bearings in the cross-bar of the frame. The lever L is geared to another lever, N, on the rock-shaft M', in the manner shown in Fig. 5. On the rock-shaft M, which carries the lever L, is another lever, L', and the two levers are connected together by a pin, $m'$, which serves to restore the outer arms of the upper heddle-levers to a horizontal position after they have been acted on by the depressing-bar $a'$ through the medium of the jacks. In like manner the rock-shaft, which carries the lever N, has a like lever, N', and the two levers are connected together by a pin, $m$, which serves to depress the outer arms of the upper levers and to restore the latter to a horizontal position. The pin $m$ of the levers N and N' is connected to the bar $a$ by rods $b\ b$, and the pin $m'$ of the levers L and L' to the bar $a'$ by the rods $b'$. A vibratory motion in contrary directions is imparted to the two rock-shafts M and M' by means of the crank J and slotted sliding bar K, and hence a reciprocating motion in contrary direction is imparted to the bars $a$ and $a'$. To a pin, $n$, at the rear of the frame A', is hung the pattern or index wheel P, having on its periphery pins or projections, and on this wheel are ratchet-teeth $p$ adapted to a pawl, $q$, on an arm, Q, secured to a shaft, $t$, which passes through the frame A', and has a curved arm, $t'$, acted on by pins on the sliding bar K, so as to impart a vibratory motion to the shaft $t$ and arm Q, and thus actuate the pawl and impart the desired intermittent rotary motion to the pattern or index wheel. In the frame A' are guided a number of horizontal slides, $u$, Fig. 2, one slide opposite the edge of each jack, and each slide has in its outer end a number of orifices, into any one of which can be fitted a pin, $v$. In the present instance there are but three jacks, and, consequently, but three slides. Owing to the inclination of the cords or wires I, which connect the jacks to the lower heddle-levers, the said jacks have a tendency to force the slides outward when they are at liberty, an inward movement being imparted to the slides by the direct action of the bent end of an arm, R, the vertical position of which is dependent upon the pattern or index wheel P, as shown in Fig. 3, this arm R being connected to an arm, R', on a shaft, S, which passes through the frame A', and which is provided with an arm, S', the latter being operated in one direction by a cam, T, on the driving-shaft B, and in the opposite direction by a spring, $w'$, bearing against the arm R', Fig. 3. It is immaterial, however, from what source or through what mechanism the arm R derives its reciprocating movement, providing such movement occurs at the proper intervals, and providing it depends for its vertical position during its inward movement on a pattern-wheel or pattern-chain. In the present instance there are but three positions which the arm can assume during its inward movement, and the pins of the pattern-wheels determine which of the three positions the arm should assume, and, consequently, which of the slides $u$ and which of the jacks should be operated; and the pins $v$ of the slides may be so adjusted as to be presented to the striking action of the arm R at any one of the three positions which the arm is made to assume by the pattern-wheel.

The changes which can be effected in the movement of the heddles by varying the pins of the pattern-wheel, and by varying the position of the pins in the slides, will be readily understood by those familiar with the art of weaving, without explanation. It will also be seen that by the above light and simple mechanism the complex, cumbrous, and expensive pattern-chain employed in looms of this class for operating the jacks is dispensed with. An endless pattern-chain, however, may be substituted for the pattern-wheel P for controlling the striking-arm R; but the chain for this purpose may be light and short compared with ordinary pattern-chains.

Arms bearing against the jacks may be substituted for the slides $u$, the arms being hung to the frame and having pins $v$ to be struck by the arm R.

I claim as my invention—

1. The combination, with hooked jacks, of slides $u$, or their equivalents, and a striking-arm controlled by a pattern-wheel or a pattern-chain, all substantially as described.

2. The said slides $u$, or their equivalents, each having a number of holes for receiving pins, in combination with the striker, operating substantially as set forth.

In testimony whereof I have signed my name to this specification in the presence of two subscribing witnesses.

ROBERT B. GOODYEAR.

Witnesses:
WM. A. STEEL,
HARRY SMITH.